US012719385B2

(12) United States Patent
Mohamed Sayed Ahmed et al.

(10) Patent No.: US 12,719,385 B2
(45) Date of Patent: Aug. 25, 2026

(54) HYBRID CONTROL TOPOLOGY FOR REGENERATIVE CASCADED H-BRIDGE CIRCUITRY

(71) Applicant: Rockwell Automation Technologies, Inc., Mayfield Heights, OH (US)

(72) Inventors: Ahmed Mohamed Sayed Ahmed, Mequon, WI (US); Zhongyuan Cheng, Kitchener (CA); Ahmed Abuelnaga, Dundas (CA); Marius G. Chis, Cambridge (CA); Brian J. Seibel, Grafton, WI (US); Navid R. Zargari, Kitchener (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 154 days.

(21) Appl. No.: 18/894,354

(22) Filed: Sep. 24, 2024

(65) Prior Publication Data

US 2026/0088733 A1 Mar. 26, 2026

(51) Int. Cl.
*H02M 1/32* (2007.01)
*H02M 1/00* (2006.01)
(Continued)

(52) U.S. Cl.
CPC ..... *H02M 7/53871* (2013.01); *H02M 1/0009* (2021.05); *H02M 1/007* (2021.05); *H02M 1/325* (2021.05); *H02M 7/49* (2013.01)

(58) Field of Classification Search
CPC .......... H02M 5/458; H02M 5/40; H02M 5/42; H02M 5/44; H02M 5/443; H02M 5/45; H02M 5/4505; H02M 5/451; H02M 5/452; H02M 5/4585; H02M 5/293; H02M 5/297; H02M 5/275; H02M 5/22; H02M 1/32; H02M 1/08; H02M 1/0009; H02M 1/325; H02M 7/003; H02M 7/483; H02M 7/49; H02M 7/06; H02M 3/33523; H02M 3/3376; H02M 3/155; H02M 3/1582; H02J 3/34; H02J 3/38; H02J 3/46; H02H 7/1227; H02H 7/122
See application file for complete search history.

(56) References Cited

U.S. PATENT DOCUMENTS 6,847,531 B2 * 1/2005 Bixel .................... H02M 7/797 363/71

* cited by examiner

*Primary Examiner* — Bryan R Perez

(57) ABSTRACT

Disclosed is a system with regenerative cascaded H-bridge circuitry leveraging a hybrid control topology, an example of which is a variable frequency drive. Hybrid control allows for substantially cost and efficiency-improved implementation. With hybrid control, fault detection and gating control are split into those features managed at an regenerative power cell level (e.g., fundamental front-end control), those features managed at a central controller level (e.g., alternating-current over/under voltage detection), and those features that may be collaboratively managed by both the regenerative power cell and controller control (e.g., phase synchronization, direct-current bus over/under voltage detection, and power loss). Hybrid control uses current sensors at the input to the primary coil of a transformer in the system and voltage sensing at each regenerative power cell of the system. Voltage sensing at each regenerative power cell (Continued)

eliminates the need to calibrate the transformer during commissioning, while fewer current sensors improve implementation cost.

20 Claims, 7 Drawing Sheets

(51) Int. Cl.
*H02M 7/49* (2007.01)
*H02M 7/5387* (2007.01)

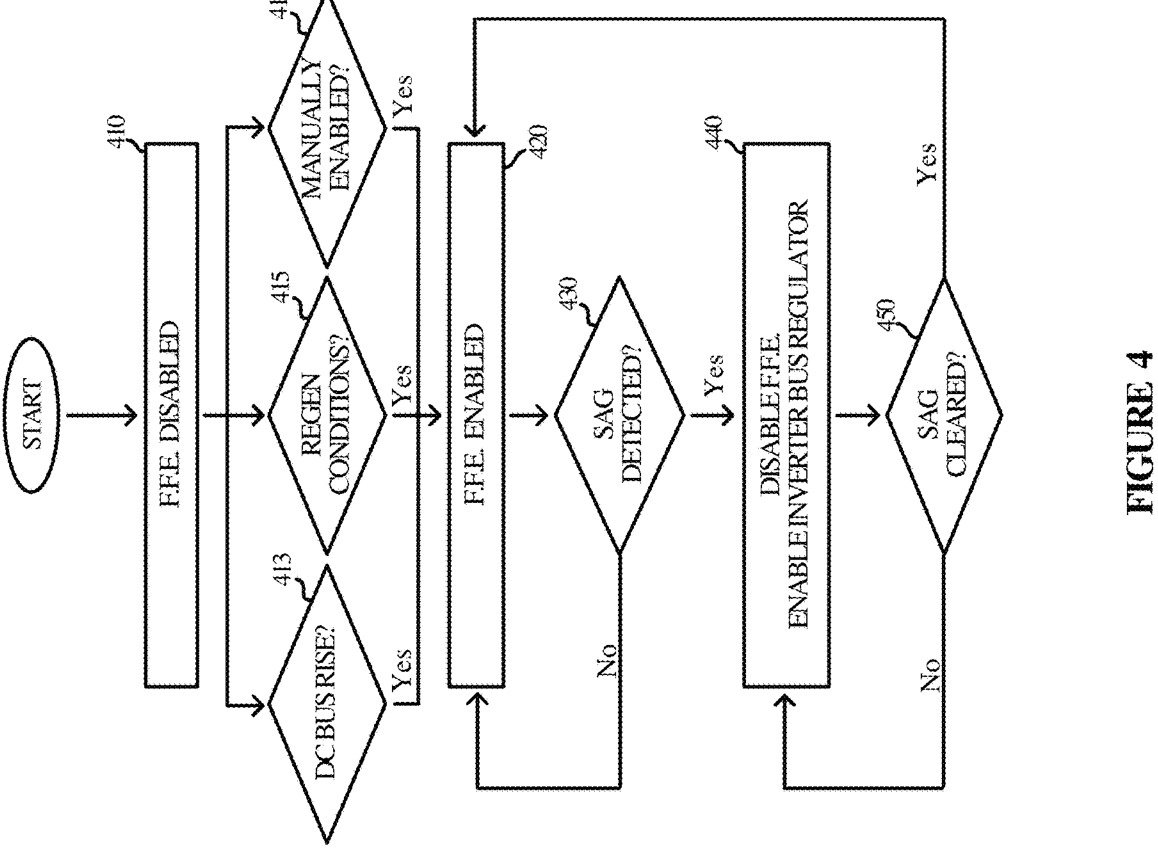
FIGURE 4

HYBRID CONTROL TOPOLOGY FOR REGENERATIVE CASCADED H-BRIDGE CIRCUITRY

BACKGROUND

Multilevel converters (MLCs) are extensively employed in industrial automation applications. MLCs produce modified sine wave signals made up of individual steps (modified sine wave). One such MLC is variable frequency drive (VFD) system implemented using cascaded H-bridge circuitry (CHB). The VFD system controls the operation of the motor load by varying the frequency and amplitude of the AC output signal. VFD devices are used in a wide variety of applications, including industrial automation applications, and offer improved efficiency over many mechanical control systems.

To support the relatively strict power quality requirements of many medium-voltage and high-voltage VFD applications, CHBs are being developed with an increasing number of layers to facilitate an increased number of steps and decreased step size in the output signal. The increased number of steps on the output signal and decreased step size both result in a "smoother" sine wave that more accurately replicates a pure sine wave. Where the CHB's output signal effectively replicates a pure sine wave (and the load requires a pure sine wave), the power quality of the VFD output is relatively high.

Unfortunately, increasing the number of steps in a CHB's output signal directly corresponds to an increase in the cost of implementing the CHB in fully distributed control topologies. To increase the number of steps in a CHB's output signal, additional power cells are added to the CHB. In fully distributed control topologies, each additional power cell includes multiple current sensors, representing a significant cost in multilevel drives. Further, the cost increase is compounded in a VFD using a CHB to drive a three-phase load, as each additional layer requires additional power cells, resulting in many additional current sensors needed for the VFD. In fully centralized control topologies, implementing a VFD requires resource-intensive commissioning, particularly with respect to the VFD's transformer. Accordingly, improvements to cascaded H-bridge topologies for variable frequency drives are needed.

SUMMARY

The disclosure describes a variable frequency drive (VFD) system with a hybrid control topology for regenerative cascaded H-bridge circuitry. The system leverages a hybrid control topology, a novel regenerative H-bridge control topology that allows for substantially cost-improved implementation.

Under the hybrid control topology, system fault detection and gating control are split into those features managed at an individual regenerative power cell level (e.g., fundamental front-end control), those features managed at a central controller level (e.g., alternative current over/under voltage detection), and those features that may be collaboratively managed by both the regenerative power cell and controller control (e.g., phase synchronization, direct current bus over/under voltage detection, and power loss).

The hybrid control topology is first characterized by the placement of current sensors only at the primary of a transformer in the system, thereby significantly reducing the cost to implement a VFD. Notably, the hybrid control topology lacks current sensors for the regenerative power cell. In fact, the hybrid control topology generally does not require more than three current sensors in three-phase input scenarios (one used for each phase of a potential three-phase input signal), regardless of the number of layers and power cells operating in the system.

The central controller is coupled to both the current sensors and the output of the system and receives current and voltage sensing information via those couplings, respectively. Based on the current and voltage sensing information, the central controller detects faults in the operation of the system and interprets the faults. Based on interpreting a particular fault, the central controller leverages inverter gating logic to create inverter gating generation instructions to remedy the fault. The inverter gating generation instructions are delivered to the inverter gating circuitry via the central controller's coupling to the regenerative power cell, where the gating operation of the inverter acts in accordance with the instructions. As a result, the fault in system operation is remedied or mitigated.

The hybrid control topology is further characterized by the inclusion of voltage sensing at the input to the regenerative power cell. The regenerative power cell evaluates voltage signals at its input, which is also the secondary coil of the transformer, to facilitate fault detection at the regenerative power cell level. A controller onboard the regenerative power cell includes logic that interprets detected faults and responds by creating converter gating generation instructions and delivering them to the relevant gating circuitry. The converter modifies gating logic, and as a result, the faulted operation of the VFD is remedied. Notably, the system can leverage the secondary coil voltage sensing information acquired by the regenerative power cell along with primary coil current sensing, and in some cases input source information or additional primary coil voltage sensing at the central controller, to fully characterize the transformer. This eliminates the need to calibrate or characterize the transformer (e.g., input phase shift angles) when implementing the system, reducing commissioning time and improving the efficiency of deploying such a system.

The system includes a transformer, current sensors, a regenerative power cell, and a central controller. The current sensors are coupled to the primary windings of the transformer, the regenerative power cell is coupled to the secondary coil of the transformer, and the central controller is coupled to the current sensors, the regenerative power cells, and the direct current (DC) bus associated with power cells. In some embodiments, the central controller is coupled directly to the primary coil of the transformer.

The regenerative power cells include a converter circuit, an inverter circuit, an output terminal, and a controller. The converter includes a 3-phase regenerative bridge and its input is coupled with the secondary coil of the transformer. The inverter includes H-bridge circuitry, its input being coupled with the output of the converter and its output coupled with the output terminals. The controller of the regenerative power cell includes cell fault detection logic and converter gating control logic. Based on voltage values at the input of the regenerative power cell, the controller of the regenerative power cell performs fault detection. Based on detected faults, the controller of the regenerative power cell leverages the converter gating control logic to control converter gating.

The central controller includes cell fault detection logic and inverter gating control logic. Based on current sensing values from the current sensors received at the central controller, the central controller detects faults, and in response to a fault, the central controller leverages the inverter gating control logic to control inverter gating.

In some embodiments, the system includes a number of regenerative power cells. In some other embodiments, the system includes a number of regenerative power cells coupled together to produce a three-phase output.

In some embodiments, the central controller is further coupled directly to the primary coil of the transformer. The central controller receives voltage detecting information from the primary coil, which facilitates additional and enhanced fault detection. In some further embodiments, the central controller, in response to detecting a fault, generates and sends converter gating generation instructions to the regenerative power cell.

In a number of embodiments, the central fault detection of the central controller includes voltage sag detection logic, thermal overload detection logic, input phase loss detection logic, voltage unbalance detection logic, alternating current (AC) over voltage and under voltage detection logic, DC over voltage and under voltage detection logic, or a combination thereof. In some embodiments, the cell fault detection of the regenerative power cell controller includes phase synchronization detection logic.

In an embodiment, the central fault detection further includes power regeneration detection logic, DC bus rise detection logic, voltage sag detection logic. Voltage sag detection is logic that detects when a voltage sag has occurred, and also when an existing a signal experiencing voltage sag has recovered. In such an embodiment, where power regeneration, a DC bus rise, or an indication to manually enable fundamental front-end (FFE) control are detected, the central controller enables FFE control. With FFE control enabled, where the central controller detects voltage sag, the central controller disables FFE control and enables an inverter bus regulator. Enabling the inverter bus regulator and disabling FFE refers to the process in which the DC bus goes from being controlled by the controller of the regenerative power cell via the converter to being controlled by the central controller via the inverter. More specifically, control of the DC bus refers to the authority to modify gating behavior of either the converter or the inverter in order to manage performance of the VFD. Where the inverter bus regulator has been enabled and FFE has been disabled, the authority to modify gating behavior at the inverter is given to the central controller, while the authority to, by the controller of the regenerative power cell, control gating at the converter is halted. Where FFE control is disabled, the inverter bus regulator is enabled. Meanwhile, when the voltage is recovered back to its nominal value, the central controller disables the inverter bus regulator and enables FFE control. In other words, the authority to modify gating behavior of the inverter at the central controller is halted, while the authority to control gating at the converter is given to the controller of the regenerative power cell. Once authority is granted to either the controller of the regenerative power cell or the central controller, gate drive logic specific to the converter or the inverter, respectively, is used to inform how gating is to be managed in order to mitigate or amend the effects of the relevant operational conditions.

In some embodiments, the primary coil of the transformer and secondary coil of the transformer each comprise one of a delta winding configuration, a star winding configuration, or a zigzag winding configuration. In some embodiments, the primary coil of the transformer receives a three-phase input and the output of the VFD is coupled with a balanced three-phase load. In such an embodiment, only one current sensor is necessary to fully evaluate primary coil current.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 4 illustrates a method of operating a system in accordance with some embodiments of the present technology.

DETAILED DESCRIPTION

Figure 1:
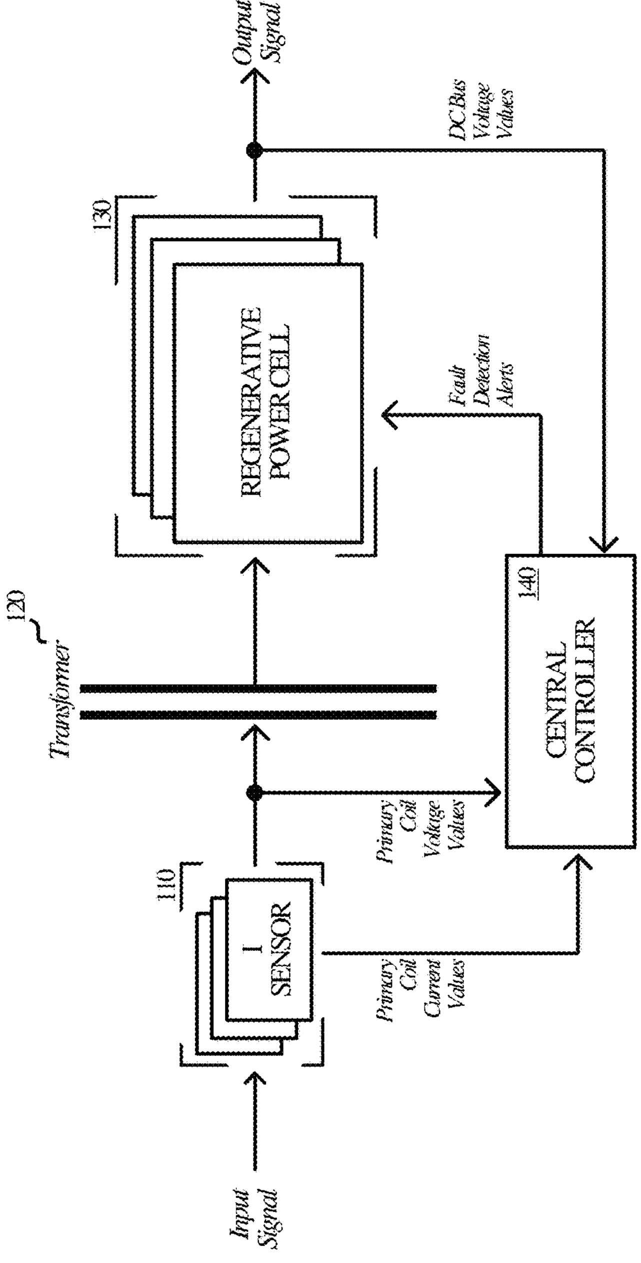
FIG. 1 illustrates a system in accordance with some embodiments of the present technology.

The disclosure describes a system with a hybrid control topology for regenerative cascaded H-bridge circuitry. For example, the system may be a variable frequency drive (VFD) device. The system leverages a hybrid control topology, a novel regenerative H-bridge control topology that allows for substantially cost-improved implementation.

Under the hybrid control topology, system fault detection and gating control are split into those features managed at an individual regenerative power cell level (e.g., fundamental front-end control), those features managed at a central controller level (e.g., alternative current over/under voltage detection), and those features that may be collaboratively managed by both the regenerative power cell and controller control (e.g., phase synchronization, direct current (DC) bus over/under voltage detection, and power loss).

The hybrid control topology is first characterized by the placement of current sensors only at the primary of a transformer in the system, thereby significantly reducing the cost to implement the system. Notably, the hybrid control topology lacks current sensors for the regenerative power cell. In fact, the hybrid control topology generally does not require more than three current sensors in three-phase input scenarios (one used for each phase of a potential three-phase input signal), regardless of the number of layers and power cells operating in the system.

The central controller is coupled to both the current sensors and the output of the system and receives current and voltage sensing information via those couplings, respectively. Based on the current and voltage sensing information, the central controller detects faults in the operation of the system and interprets the faults. Based on interpreting a particular fault, the central controller leverages inverter gating logic to create inverter gating generation instructions to remedy the fault. The inverter gating generation instructions are delivered to the inverter gating circuitry via the central controller's coupling to the regenerative power cell, where the gating operation of the inverter acts in accordance with the instructions. As a result, the fault in system operation is remedied or mitigated.

Some examples of the system described herein include the ability to maintain the connection of the load and the source during some periods of lower source voltage. This feature is commonly referred to as low-voltage ride through (LVRT). For example, during low source voltage situations, inverter gating control can be revised to compensate for the decrease in source voltage and to produce an output with particular characteristics as the load is anticipating.

The hybrid control topology is further characterized by the inclusion of voltage sensing at the input to the regenerative power cell. The regenerative power cell evaluates voltage signals at its input, which is also the secondary coil of the transformer, to facilitate fault detection at the regenerative power cell level. A controller onboard the regenerative power cell includes logic that interprets detected faults and responds by creating converter gating generation instructions and delivering them to the relevant gating circuitry. The converter modifies gating logic, and as a result, the faulted operation of the system is remedied. Notably, the system can leverage the secondary coil voltage sensing information acquired by the regenerative power cell along with primary coil current sensing acquired by the central controller, and in some cases input source information or additional primary coil voltage sensing at the central controller, to fully characterize the transformer. This eliminates the need to calibrate or characterize the transformer (e.g., input phase shift angles) when implementing the system, reducing commissioning time and improving the efficiency of deploying such a system.

Beneficially, a hybrid control topology has advantages over existing control topologies used for regenerative cascaded H-bridges. Notably, the hybrid control topology leverages current sensors connected in series between the input of the system and the primary coil of the transformer. The inclusion of current sensors in this location facilitates system fault detection at the central controller while eliminating the need for current sensors in each regenerative power cell utilized under a fully distributed control topology for the regenerative cascaded H-bridge. This significantly improves the cost of implementing a regenerative cascaded H-bridge, as the number of current sensors is substantially reduced. Further, where the regenerative cascaded H-bridge produces a three-phase output, additional regenerative power cells are needed for each phase output, compounding the expense of implementing the regenerative cascaded H-bridge. This is a particular problem in high-voltage applications where the regenerative cascaded H-bridge must produce a modified sine wave having a particular minimum number of steps and therefore must include a minimum number of regenerative power cells.

Another benefit of the hybrid control topology results from the inclusion of voltage sensing and fault detection at each regenerative power cell. The inclusion of voltage sensing and fault detection in each regenerative power cell facilitates fault detection at the regenerative power cell level. Notably, under the hybrid-control topology, the system can acquire voltage sensing information from both the primary coil and secondary coil of the transformer. This allows the system to evaluate the signal characteristics on both sides of the transformer, and therefore allows the system to fully characterize the operation of the transformer. In a fully centralized control topology for the regenerative cascaded H-bridge, user input is required to characterize the transformer during commissioning. In particular, phase shift angles of the transformer must be entered during commissioning. Under the hybrid control topology, as a result of the ability to evaluate the signal characteristics on both sides of the transformer, user input is not necessary to characterize the transformer and commissioning is improved.

Further, under the hybrid control topology, voltage and current sensing performed at the primary coil of the transformer provides undistorted information about the input signal. At the primary coil, the input signal has not yet undergone any distortion from passing through components of the regenerative cascaded H-bridge. As such, an evaluation of the input signal can be carried out on information collected at the input signal itself as opposed to a distorted signal that may require additional signal processing. For example, sag detection can be performed by the central controller based on voltage and current sensing information from the primary coil, current sensor 110*a*, and current sensor 110*b*, respectively.

Now turning to the figures, FIG. 1 illustrates system 100 according to an implementation of the present technology. System 100 may be a variable frequency drive. System 100 includes one or more current sensors 110, transformer 120, one or more regenerative power cells 130, and central controller 140.

System 100 is generally representative of an industrial automation device (e.g., a variable frequency drive or VFD) that is utilized to control motor loads in a variety of applications. System 100 may also be applicable to a variety of other loads that are dependent on voltage and frequency characteristics of an alternating current (AC) signal input, such as transformers, induction heating systems, amplifiers, and the like. System 100 receives an input signal and processes the input signal to generate an output signal. The output signal of system 100 is used to drive electrical loads.

One or more current sensors 110 are generally representative of one, or multiple, current sensing devices for evaluating the current component of an electrical signal. One or more current sensors 110 are coupled with the input signal, the primary coil of transformer 120, and with central controller 140. Here, one or more current sensors 110 are placed along the conducting line carrying the input signal of system 100. Note that one or more current sensors 110 may comprise a single current sensor, a pair of current sensors, or a group of three current sensors in different applications. One or more current sensors 110 are communicatively coupled with central controller 140 such that one or more current sensors 110 transmit current sensing values that correspond with the input signal to the central controller.

Instead of the two current sensors needed for each power cell in a fully distributed control cascaded H-bridge topologies, the disclosed hybrid control topology uses one or more current sensors 110 coupled with the input signal. Critically, under the hybrid control topology, no current sensors are used in the power cell of the device (e.g., regenerative power cell 130). As a result, the cost of implementing system 100 is greatly improved. Many higher voltage applications require AC input signals of a particular power quality (the actual input signal accurately matches the desired input signal). To achieve this, additional levels of power cells are used to increase the number of steps and shorten the length of each step in a modified AC signal. Under a hybrid control topology, no more than three current sensors attached to the input signal are needed. Compared to existing topologies that require additional current sensors for each additional power cell, the hybrid control topology is significantly more cost-effective.

Further, acquiring current sensing values from current sensors placed at the input signal provides a less distorted signal for evaluation compared to current sensors placed at the regenerative power cell level, which have already been distorted to some degree by having passed through transformer 120 (e.g., signals evaluated at the transformer's secondary coil may attenuated, phase shifted, include harmonic distortion, and include electromagnetic and thermal noise).

Transformer 120 is generally representative of a passive component that transfers electrical energy from one circuit to another via a magnetic core. Based on characteristics such as core permeability, winding inductance, and winding schema, transformer 120 steps up or steps down an input signal for transmission, distribution, or utilization. Transformer 120 may be made up of a variety materials in a variety of layouts and may have different characteristics depending on an intended application or application environment. Transformer 120 has a primary coil and a secondary coil. The primary coil is coupled to the input signal, upon which one or more current sensors 110 generate current sensing values and transmit them to central controller 140. The secondary coil is coupled to the input of one or more regenerative power cells 130. The primary coil and secondary coil may carry a single phase of AC signal or may also carry multiple phase of AC signals. Where multiple phases of AC signal are present, the primary coil and secondary coil may comprise multiple bundled coils. In some cases, secondary coil is coupled to multiple separate outputs. The primary coil and secondary coil may be wound in a number of winding configurations, including a delta configuration, a star configuration (also called a Wye configuration), or a zigzag configuration.

One or more regenerative power cells 130 are generally representative of one, or multiple, power cells facilitating the output signal characteristics of system 100. The input of one or more regenerative power cells 130 is coupled with the secondary coil of transformer 120, and the output of one or more regenerative power cells 130 produces the output signal of system 100. One or more regenerative power cells 130 are made up of gating circuitry that connects and disconnects conductive pathways such that an input signal can be inverted or scaled. In some cases, the gating circuitry is made up of insulated gate bipolar transistors (IGBT). One or more regenerative power cells 130 are described in additional detail in the text associated with FIG. 2.

Figure 7:
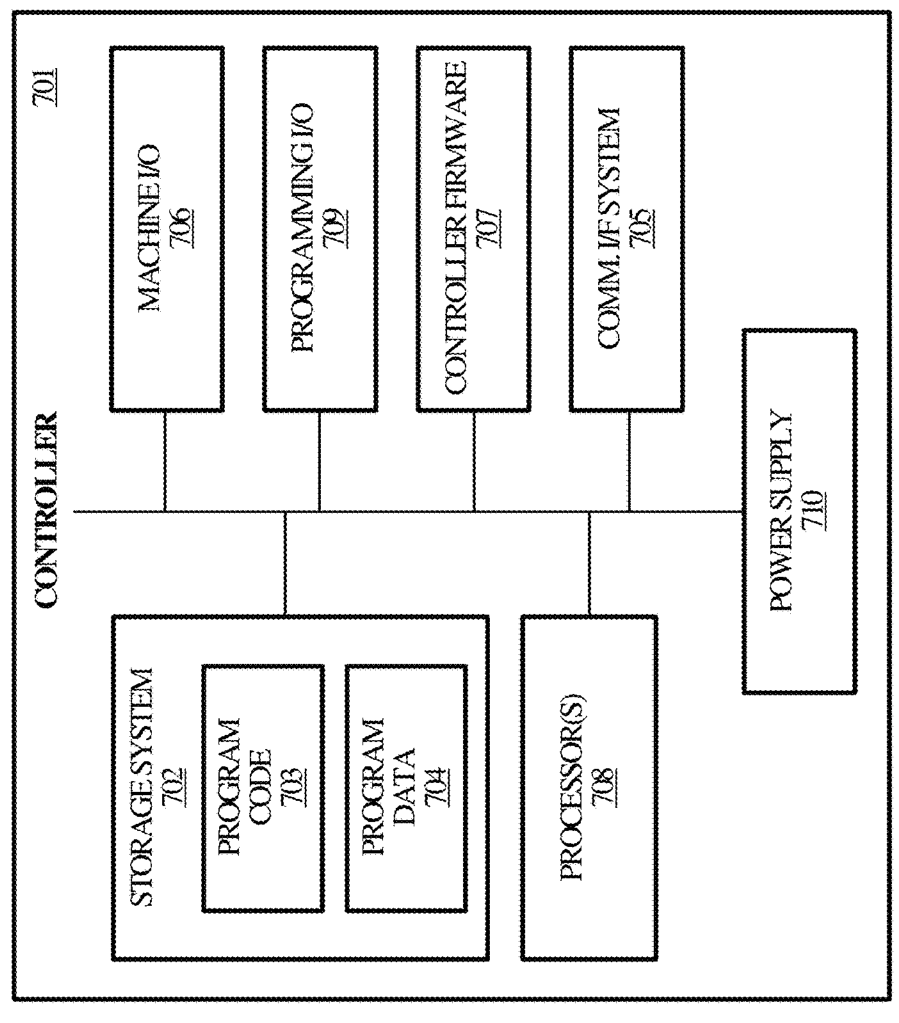
FIG. 7 illustrates a controller used in accordance with some embodiments of the present technology.

Central controller 140 is generally representative of a controller device sufficient to logically manage and direct other devices, of which controller 701 of FIG. 7 is an example. Central controller 140 is generally configured to receive current and voltage sensing information and to respond with instructions that dictate how the elements of system 100 are to act in order to maintain operation or to rectify a fault. Central controller 140 may be a microprocessor, a distributed computing device, or the like. Central controller 140 is coupled to one or more current sensors 110 and to one or more regenerative power cells 130. Central controller 140 is further coupled with the conducting lines carrying the input signal of system 100 and the output signal of system 100. Central controller 140 receives the voltage and determines a value for the voltage. Central controller 140 may determine values for voltages received by leveraging voltage sensing digital pins coupled with central controller 140, by leveraging an analog-to-digital converter coupled to central controller 140, or by some other means of evaluating the magnitude of a voltage. Central controller 140 receives current sensing information from one or more current sensors 110, voltage sensing information from the coupling corresponding to the input signal, and voltage sensing information from the coupling corresponding to the output signal. Central controller 140 is described in additional detail in the text associated with FIG. 3.

In operation, system 100 receives the input signal, processes the input signal, and generates an output. The behavior of system 100 can be tailored by configuring certain parameters and materials of transformer 120 such that particular function and output characteristics are expected. When some anomaly occurs in the expected function and output characteristics of system 100, this represents a fault. Different kinds of faults can be detected with different combinations of sensing data. Notably, under the hybrid control topology, some portion of fault detection and management of the respective faults occurs at central controller 140, while some portion occurs at one or more regenerative power cells 130. In an example, current sensing information associated with the input signal is collected at one or more current sensors 110 and sent to central controller 140. Central controller 140 evaluates the current sensing information and detects faults by leveraging central fault detection logic. Where a fault is detected, central controller 140 responds to the fault by transmitting gating instructions to the relevant gating circuitry such that gating control is revised and the fault is mitigated. In some cases, central controller 140 compares current sensing information received from one or more current sensors 110 and compares the information with other sensing information, such as voltage sensing performed at the output of system 100.

Figure 2:
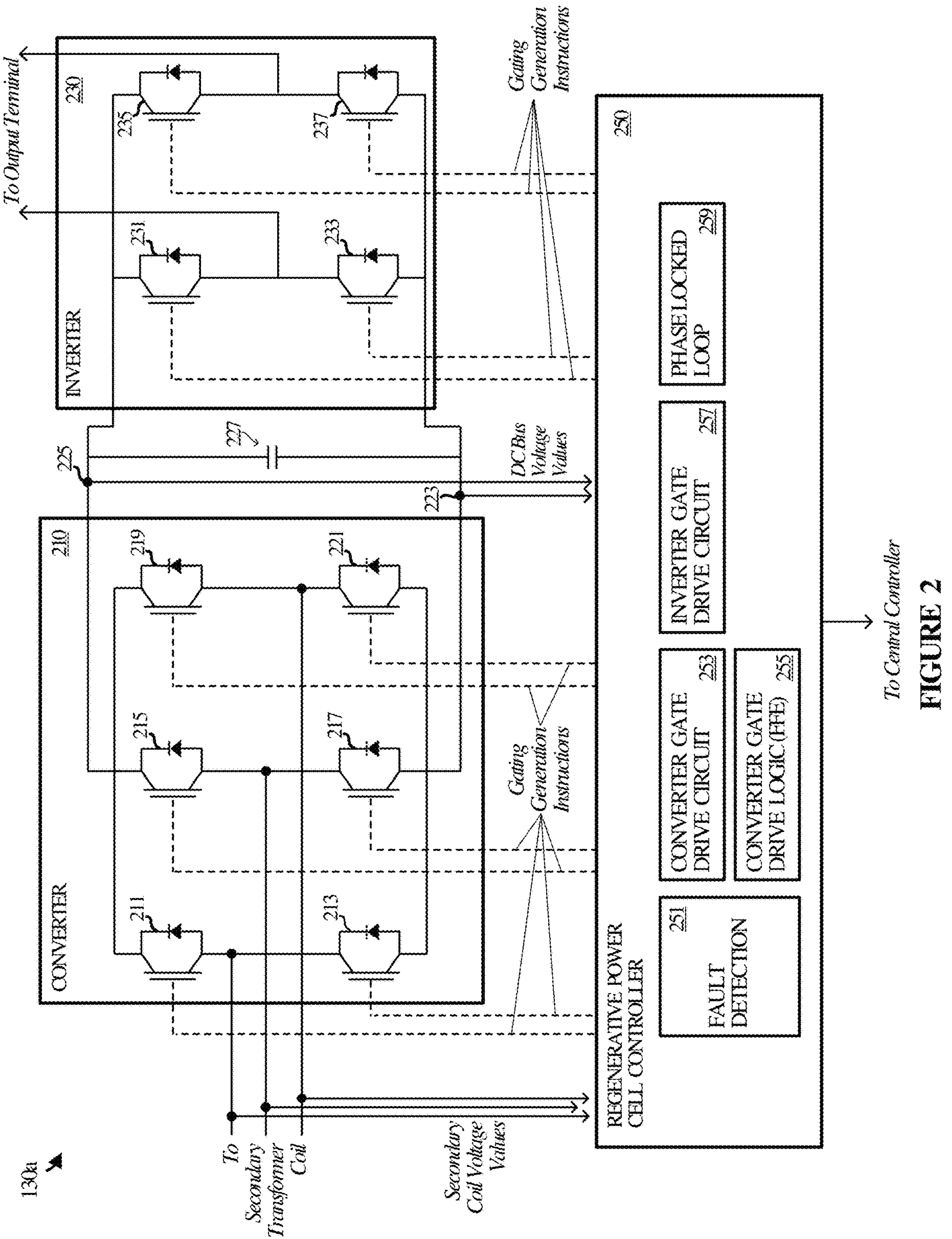
FIG. 2 illustrates a regenerative power cell in further detail in accordance with some embodiments of the present technology.

FIG. 2 illustrates regenerative power cell 130*a* according to an implementation of the present technology. Regenerative power cell 130*a* is representative of a regenerative power cell of one or more regenerative power cells 130. Regenerative power cell 130*a* may be considered with regard to the elements of system 100.

Regenerative power cell 130*a* further includes converter 210, DC bus negative connection 223, DC bus positive connection 225, capacitor bank 227, inverter 230, and regenerative power cell controller 250. Converter 210 further includes gate 211, gate 213, gate 215, gate 217, gate 219, and gate 221. Inverter 230 further includes gate 231, gate 233, gate 234, and gate 237. Regenerative power cell controller 250 further includes fault detection 251, converter gate drive circuitry 253, converter gate drive logic 255, inverter gate drive circuitry 257, and phase locked loop 259.

Converter 210 is generally representative of a converter circuit made up of 3-phase bridge circuitry. Converter 210 receives an AC input signal and outputs a scaled DC signal. The input of converter 210 is coupled with the secondary coil of transformer 120 of FIG. 1, and the output of converter 210 is coupled with the input of inverter 230. Each of gate 211, gate 213, gate 215, gate 217, gate 219, and gate 221 are voltage-controlled gating components that block that flow of current when disabled and allow the flow of current when enabled. Control of the gating function of each of gate 211, gate 213, gate 215, gate 217, gate 219, and gate 221 is managed at regenerative power cell controller 250. Gate 211 and gate 213 are associated with a first phase input, gate 215 and gate 217 are associated with a second phase input, and gate 219 and gate 221 are associated with a third phase input. To create the output of converter 210, gate 211, gate 215, and gate 219 are coupled together, as well as gate 213, gate 217, and gate 221, respectively. The output of converter 210 is coupled with both DC bus negative connection 223 and DC bus positive connection 225, which are in turn coupled with the input of inverter 230.

DC bus negative connection 223 and DC bus positive connection 225 are representative of a pair of conductive lines that carry the DC bus voltage of the converter 210. Control of the DC bus voltage may be managed by a central controller, such as central controller 140, or may else be managed by regenerative power cell controller 250. Whether regenerative power cell controller 250 manages the DC bus voltage between DC bus negative connection 223, and DC bus positive connection 225 via converter 210, or instead whether central controller 140 manages the DC bus voltage between DC bus negative connection 223 and DC bus positive connection 225 via converter 210 is a result of the operational conditions of the system (e.g., system 100 of FIG. 1). Examples of operational conditions include scenarios where the system experiences alternative current over/under voltage, phase synchronization, direct current bus over/under voltage detection, or power loss. In response to such conditions, control of DC bus voltage between DC bus negative connection 223 and DC bus positive connection 225 is awarded to either regenerative power cell controller 250, which leverages converter 210, or to central controller 140, which leverages inverter 230.

To leverage converter 210 to mitigate or amend the effects of the relevant operational conditions, or to otherwise operate normally, converter gate drive logic 255 is used to inform how gating of converter 210 should be configured. Regenerative power cell controller 250 then configures the performance of gate 211, gate 213, gate 215, gate 217, gate 219, and gate 221 via converter gate drive circuitry 253 based on the converter gating logic. Converter gate drive circuitry 253 is coupled with the gate terminal of gate 211, gate 213, gate 215, gate 217, gate 219, and gate 221. Applying sufficient voltages to each respective gate terminal results in conductivity through each of gate 211, gate 213, gate 215, gate 217, gate 219, and gate 221, which otherwise would not conduct current. The voltages applied to each respective gate terminal are determined based on converter gate drive logic 255. In certain conditions, one or more of gate 211, gate 213, gate 215, gate 217, gate 219, and gate 221 may receive greater or lesser voltages than the others. When the DC bus voltage between DC bus negative connection 223 and DC bus positive connection 225 is managed by the regenerative power cell controller 250 via converter 210 and the elements therein, this can be referred to as an enabling of the fundamental front end (FFE) and a disabling of the inverter bus regulator. In contrast, where a central controller (e.g., central controller 140 of FIG. 1) manages the DC bus voltage between DC bus negative connection 223 and DC bus positive connection 225, this can be referred to as an enabling of the inverter bus regulator and a disabling of the FFE.

To leverage inverter 230 to mitigate or amend the effects of the relevant operational conditions, gate drive logic specific to the inverter is used to inform how gating of inverter 230 should be configured. A central controller (e.g., central controller 140 of FIG. 1) then configures the performance of gate 231, gate 233, gate 235, gate 237 based on the converter gating logic via inverter gate drive circuitry 257. Inverter gate drive circuitry 257 is coupled with the gate terminal of gate 231, gate 233, gate 235, and gate 237. Applying sufficient voltages to each respective gate terminal results in conductivity through each of gate 231, gate 233, gate 235, and gate 237, which otherwise do not conduct current. The voltages applied to each respective gate terminal are determined based on inverter gate drive logic, which is located in a central controller (e.g., central controller 140 of FIG. 1). In certain conditions, one or more of gate 231, gate 233, gate 235, and gate 237 may receive greater or lesser voltages than the others.

Capacitor bank 227 is generally representative of circuitry including one or more capacitors. Capacitor bank 227, when coupled with the DC bus in a VFD, is capable of stabilizing voltages across the DC bus, ensuring smooth operation by reducing the impact of voltage spikes. In some cases, capacitor bank 227 may include one or more resistors and one or more inductors in addition to the one or more capacitors.

Inverter 230 is generally representative of an inverter circuit made up of H-bridge circuitry. Inverter 230 receives a DC input signal and outputs a scaled DC signal. The input of inverter 230 is coupled with output of converter 210 and the output of inverter 230 is coupled to output terminals. The output of inverter 230 is equivalent to the output of one or more regenerative power cells 130 of FIG. 1. Inverter 230 includes gate 231, gate 233, gate 235, and gate 237. Each of gate 231, gate 233, gate 235, and gate 237 are voltage-controlled gating components that block that flow of current when disabled and allow the flow of current when enabled. Control of the gating function of each of gate 231, gate 233, gate 235, and gate 237 is managed at a central controller, such as central controller 140 of FIG. 1.

In some embodiments, inverter 230 is configured to facilitate the capture of power generated by the load connected to system 100. In typical operation, system 100 drives a load connected to the output of one or more regenerative power cells 130 by delivering electrical power to the load. In some scenarios however, electrical loads begin to produce power instead of consuming power. To protect the electrical elements of system 100 from an unanticipated reverse flow of current, inverter 230 is configured to switch into a power regeneration mode, and to deliver the power created at the load back to the source, or to some other location for receiving electrical power.

In some cases, multiple power cells are coupled together to produce a three-phase output. Where multiple power cells are included, the output of the inverter (such as inverter 230) of each regenerative power cell may be coupled to outputs of one or more other inverters of one or more other regenerative power cells.

Regenerative power cell controller 250 is generally representative of a controller device sufficient to logically manage and direct other devices, of which controller 701 of FIG. 7 is an example. Regenerative power cell controller 250 is generally configured to receive an input, process the input signal, and produce an output signal. In some cases, regenerative power cell **130*a* produces a modified sine wave. In other cases, regenerative power cell 130*a* may produce other output signals, such as a square wave, a sawtooth wave, and the like. Regenerative power cell 130*a* is further configured to determine voltage sensing values and to respond with instructions that dictate how the elements of regenerative power cell 130*a* are to act in order to maintain operation or to rectify a fault. Regenerative power cell controller 250 receives voltages via a coupling to the input of converter 210. Regenerative power cell controller 250 determines a value for the voltage, which may be carried out by leveraging voltage sensing digital pins coupled with regenerative power cell controller 250, by leveraging an analog-to-digital converter coupled to regenerative power cell controller 250, or by some other means of evaluating the magnitude of a voltage. The voltage sensing information acquired here is sent to fault detection 251** for further processing.

Regenerative power cell controller 250 may be a microprocessor, a distributed computing device, or the like. Regenerative power cell controller 250 is coupled to the secondary coil of transformer 120 of FIG. 1, to central controller 140, and to each of gate 211, gate 213, gate 215, gate 217, gate 219, gate 221, gate 231, gate 233, gate 234, and gate 237. Regenerative power cell controller 250 is coupled to each of gate 211, gate 213, gate 215, gate 217, gate 219, and gate 221, gate 231, gate 233, gate 234, and gate 237 such that gating functionality of each respective gate can be controlled by or via Regenerative power cell controller 250. Notably, in some embodiments, converter gating control, which directs gate 211, gate 213, gate 215, gate 217, and gate 219, is managed by regenerative power cell controller 250 based on faults detected at fault detection 251. In such embodiments, inverter gating control, which directs gate 231, gate 233, gate 235, and gate 237, is managed by a central controller based on faults detected at the central controller, such as the central fault detection of central controller 140 of FIG. 1.

Fault detection 251 is generally representative of software, hardware, or firmware configured to receive current and voltage sensing information about the function of system 100, and based on detection logic, to identify faults in the operation of system 100. Where a fault is identified, fault detection 251 sends an indication of the fault to converter gate drive logic 255.

Converter gate drive circuitry 253 is generally representative of circuitry for controlling the gating function of one or more gate components, such as gate 211. Converter gate drive circuitry 253 receives commands that direct converter gate drive circuitry 253 to revise some aspect of gate control for one or more of gate 211, gate 213, gate 215, gate 217, or gate 219, of converter 210, respectively. For example, regenerative power cell controller 250 may direct converter gate drive circuitry 253 to adjust a firing angle of one or more of gate 211, gate 213, gate 215, gate 217, or gate 219, to adjust a conduction angle of one or more of gate 211, gate 213, gate 215, gate 217, or gate 219, adjust gating timing to adjust an output magnitude, or to adjust gating timing to adjust an output phase. Converter gate drive circuitry 253 receives commands from regenerative power cell controller 250.

Converter gate drive logic 255 is logic included in regenerative power cell controller 250 that interprets voltage and current sensing information and faults to determine how to respond. Converter gate drive logic 255 directs converter gate drive circuitry 253 to control gating such that the fault observed by fault detection 251 is mitigated. Converter gate drive logic 255 may also be referred to as fundamental front-end (FFE) control. Converter gate drive logic 255 receives fault detection information from fault detection 251, based on which, converter gate drive logic 255 determines what response action to take with regard to the fault detection information. In some scenarios, converter gate drive logic 255 may receive additional fault detection information from a central controller, such as central controller 140 of FIG. 1.

Inverter gate drive circuitry 257 is generally representative of circuitry for controlling the gating function of one or more gate components, such as gate 231. Inverter gate drive circuitry 257 receives commands that direct inverter gate drive circuitry 257 to revise some aspect of gate control for one or more of gate 231, gate 233, gate 235, or gate 237, of inverter 230, respectively. For example, central controller 140 may direct inverter gate drive circuitry 257 to adjust, for one or more of gate 231, gate 233, gate 235, or gate 237, a firing angle, a conduction angle, gating timing to adjust an output magnitude, gating timing to adjust an output phase. Inverter gate drive circuitry 257 receives commands from a central controller, such as central controller 140 of FIG. 1. In some scenarios, the gate drive logic included in central controller 140 may receive fault detection information from fault detection 251, in response to which, central controller 140 generates instructions that direct inverter gate drive circuitry 257 to manage the gating operation of inverter 230 in some manner.

Phase locked loop 259 is generally representative software, hardware, or firmware configured to manage phase synchronization of different portions of system 100. Where system 100 generates a three-phase output, maintaining the phase offsets between each of the phases may require periodic phase shift correction to account for the effects that elements of system 100 may have on AC signal characteristics.

In operation, regenerative power cell controller 250 receives voltage sensing information via the coupling to the secondary coil of transformer 120. The voltage sensing information is received at fault detection 251, which interprets the information to identify any anomalous conditions corresponding to a fault. For example, voltage sensing information received at fault detection 251 may indicate that the phase offset between two inputs of the three-phase inputs has become irregular. In response to this, fault detection 251 generates a fault indicating that an issue with phase synchronization has occurred. In some cases, the fault is delivered to phase locked loop 259, which manages the fault, while in other cases, the fault is delivered to converter gate drive logic 255.

The fault is delivered to converter gate drive logic 255, which determines how to respond to the fault in order to mitigate issues with system 100 operation. Converter gate drive logic 255 determines a response to the fault and creates converter gating generation instructions. The converter gating generation instructions are delivered to converter gate drive circuitry 253, which implements the instructions to modify converter 210 gating behavior. For example, two input phases of a three-phase input are operating as anticipated but one phase is shifting to an unanticipated degree results in a phase synchronization fault. Where, for example, the input with the unanticipated phase shift is the input to gate 211 and gate 213, converter gate drive logic 255 receives the phase synchronization fault, generates converter gating generation instructions, and delivers the converter gating generation instructions to converter gate drive circuitry 253, which in turn modifies the gating behavior of gate 211 and gate 213 such that the phase shift is corrected.

In other embodiments, a fault may be generated at central controller 140 based on voltage or current sensing information received at central controller 140. In particular, where voltage or current sensing information received at central controller 140 indicates that a fault is present, central controller 140 creates inverter gating generation instructions and delivers them to inverter gate drive circuitry 257 via the coupling between central controller 140 and regenerative power cell controller 250.

Figure 3:
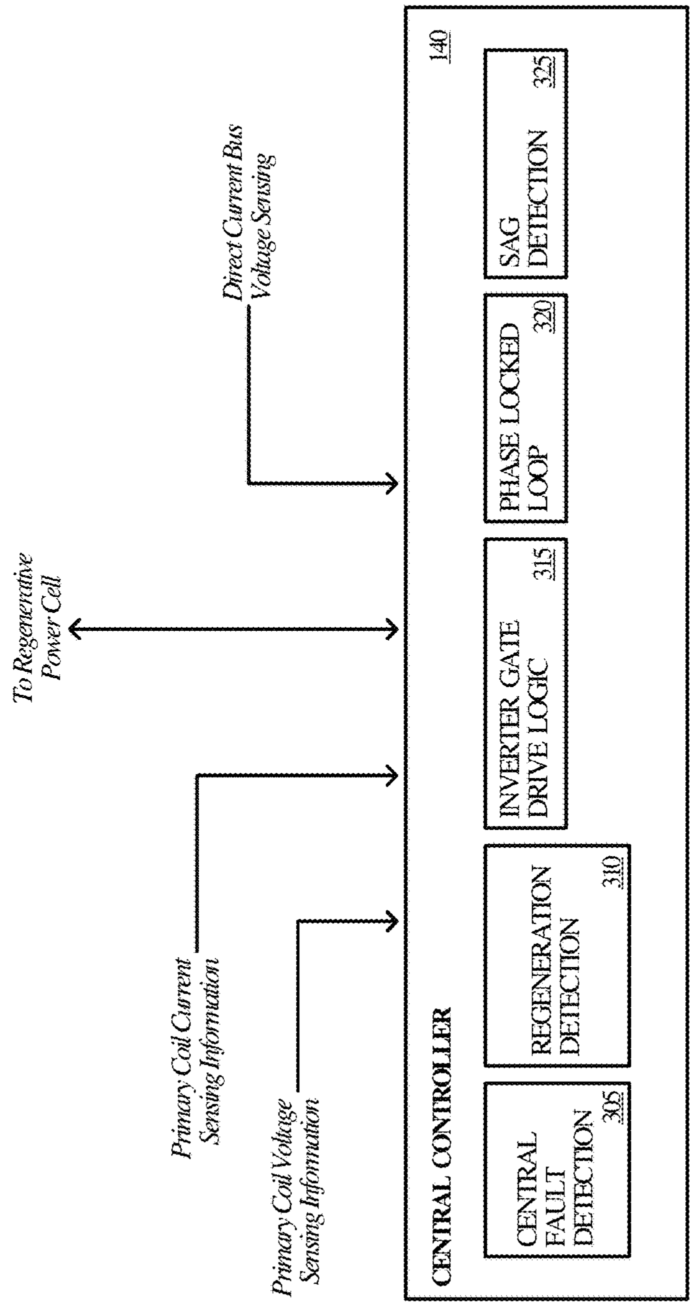
FIG. 3 illustrates a central controller in further detail in accordance with some embodiments of the present technology.

FIG. 3 illustrates central controller 140 in further detail 300 according to an implementation of the present technology. Central controller in further detail 300 includes central fault detection 305, regeneration detection 310, inverter gate drive logic 315, phase locked loop 320, and sag detection 325. Central controller in further detail 300 is also illustrated having couplings to the primary coil (e.g., the primary coil of transformer 120 of FIG. 1), to current sensors (e.g., current sensor 110*a* of FIG. 1) regenerative power cell (e.g., one or more regenerative power cells 130 of FIG. 1), and to the system output (e.g., output signal of system 100 of FIG. 1). The coupling to current sensors 110 allows central controller 140 to receive current sensing information corresponding to the input signal of system 100. The coupling directly to the primary coil of transformer 120 allows central controller 140 to receive voltage sensing information corresponding to the input signal of system 100. The coupling to one or more regenerative power cells 130 allows the central controller to transmit inverter gating generating instructions to inverter gate drive circuitry 257. The coupling to the output, also referred to as the DC bus, allows central controller 140 to receive voltage sensing information corresponding to the output of system 100.

Central fault detection 305 is generally representative of software, hardware, or firmware configured to receive current and voltage sensing information about the function of system 100, and based on detection logic, to identify faults in the operation of system 100. Where a fault is identified, central fault detection 305 sends an indication of the fault to inverter gate drive logic 315, which creates and transmits gate generation instructions inverter gate drive circuitry for implementation.

Regeneration detection 310 is generally representative software, hardware, or firmware configured to detect power regeneration scenarios and to direct inverter gate drive logic 315 to modify inverter gating operation to sufficiently receive the power back from the load. In some embodiments, the detection of power regeneration is collaboratively handled by both central controller 140 and regenerative power cell controller 250.

Inverter gate drive logic 315 is generally representative of software, hardware, or firmware that includes gating logic. The gating logic is used to inform decisions about how inverter gating should be configured in various scenarios. In certain scenarios where inverter gate drive logic 315 is implicated, inverter gate drive logic is used by central controller 140, which then configures inverter gate operation via an inverter gate drive circuitry (e.g., inverter gate drive circuitry 257 of FIG. 2)

Phase locked loop 320 is generally representative software, hardware, or firmware configured to manage phase synchronization of different portions of system 100. Where system 100 generates a three-phase output, maintaining the phase offsets between each of the phases may require periodic phase shift correction to account for the effects that elements of system 100 may have on AC signal characteristics.

In operation, central controller 140 receives current sensing information from one or more current sensors 110 at central fault detection 305. Central fault detection 305 interprets the information to detect faults. Where a fault is detected, central fault detection 305 sends an indication of the fault to inverter gate drive logic 315, which creates inverter gate generation instructions. The inverter gate generation instructions are sent to inverter gate drive circuitry 257, which implements the instructions and modifies inverter gating behavior. In some embodiments, a fault detected at central fault detection 305 is transmitted to converter gate drive logic 255 instead of inverter gate drive logic 315. In such a scenario, the fault is received at converter gate drive logic 255, which determines a response action to mitigate the fault.

FIG. 4 illustrates method 400 of operating system 100 according to an implementation of the present technology. The steps of method 400 are referenced parenthetically in the paragraphs that follow and may be carried out in the context of the systems and elements of system 100 of FIG. 1, in the context of the elements of FIG. 2, and in the context of the elements of FIG. 3.

To begin, FFE control of the system (e.g., system 100 of FIG. 1) is disabled (step 410). Where the inverter bus regulator has been enabled and FFE has been disabled, the authority to modify gating behavior at the inverter (i.e., DC bus control) is given to the central controller, while the authority to, by the controller of the regenerative power cell, control gating at the converter is halted. With the FEE control disabled, the drive doesn't have the capability to regenerate power back to the line. While the FEE control of the system is disabled, the detection of a DC bus rise (step 413), the detection of power regeneration (step 415), or the reception of an indication to manually enable FEE control, the system enables FEE control (420). Enabling the inverter bus regulator and disabling FFE refers to the process in which the DC bus goes from being controlled by the controller of the regenerative power cell (e.g., regenerative power cell controller 250 of FIG. 2) via the converter (e.g., converter 210 of FIG. 2) to being controlled by the central controller (e.g., central controller 140) via the inverter (e.g., inverter 230). More specifically, control of the DC bus refers to the authority to modify gating behavior of either the converter or the inverter, respectively, in order to manage performance of the VFD. Additional description of DC bus control, the DC bus regulator, and FFE can be found in the text associated with FIG. 2. While the FEE control is enabled, in response to detecting voltage sag (step 430), FEE control is temporarily disabled, and the inverter bus regulator is enabled (step 440). While the FEE control is disabled and the inverter bus regulator is enabled, the FEE control is re-enabled as soon as the line voltage returns to its nominal value.

Figure 5:
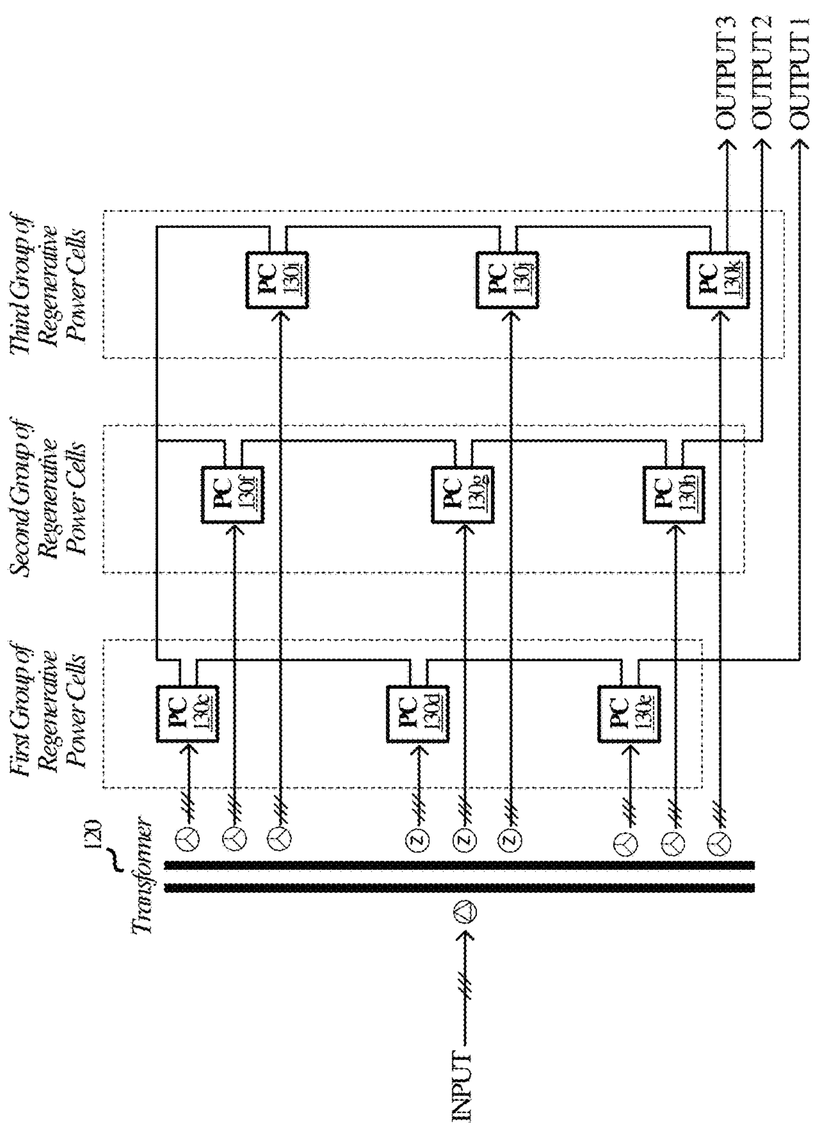
FIG. 5 illustrates a portion of a system in accordance with some embodiments of the present technology.
Figure 5:

FIG. 5 illustrates portion 500 of system 100 according to an implementation of the present technology. Portion 500 illustrates PC 130*c*, PC 130*d*, PC 130*e*, PC 130*f*, PC 130*g*, PC 130*h*, PC 130*i*, PC 130*j*, PC 130*k*. Each of PC 130*c*, PC 130*d*, PC 130*e*, PC 130*f*, PC 130*g*, PC 130*h*, PC 130*i*, PC 130*j*, and PC 130*k*, respectively, is representative of a regenerative power cell, an example of which is given by regenerative power cell 130*a* of FIG. 2. Portion 500 further includes an input signal, here illustrated as a three-phase input signal, and transformer 120 of FIG. 1.

Each of PC 130*c*, PC 130*d*, PC 130*e*, PC 130*f*, PC 130*g*, PC 130*h*, PC 130*i*, PC 130*j*, and PC 130*k* are organized into an example coupling scheme for producing a three-phase output. Each of PC 130*c*, PC 130*d*, PC 130*e*, PC 130*f*, PC 130*g*, PC 130*h*, PC 130*i*, PC 130*j*, and PC 130*k* receive an input, here illustrated as a three-phase input. Each PC 130*c*, PC 130*d*, PC 130*e*, PC 130*f*, PC 130*g*, PC 130*h*, PC 130*i*, PC 130*j*, and PC 130*k* can be organized into groups that correspond to one phase of a three-phase output. FIG. 5 shows a first group of regenerative power cells, a second group of regenerative power cells, and a third group of regenerative power cells, each of which correspond to output 1, output 2, and output 3.

PC 130*c*, PC 130*d*, and PC 130*e* are coupled together to form the first group of regenerative power cells. PC 130*f*, PC 130*g*, and PC 130*i* are coupled together to form the second group of regenerative power cells. Finally, PC 130*i*, PC 130*j*, and PC 130*k* are coupled together to form the third group of regenerative power cells. The number of power cells included in each group directly corresponds to the number of steps in a modified sine wave that system 100 is capable of producing.

Notably, this coupling of one or more regenerative power cells 130, which under existing fully distributed topologies would require eighteen total current sensors (two current sensors for each of one or more regenerative power cell 130), only requires between one and three current sensors under a hybrid control topology. This represents a substantial improvement to the cost of implementing system 100.

Figure 6:
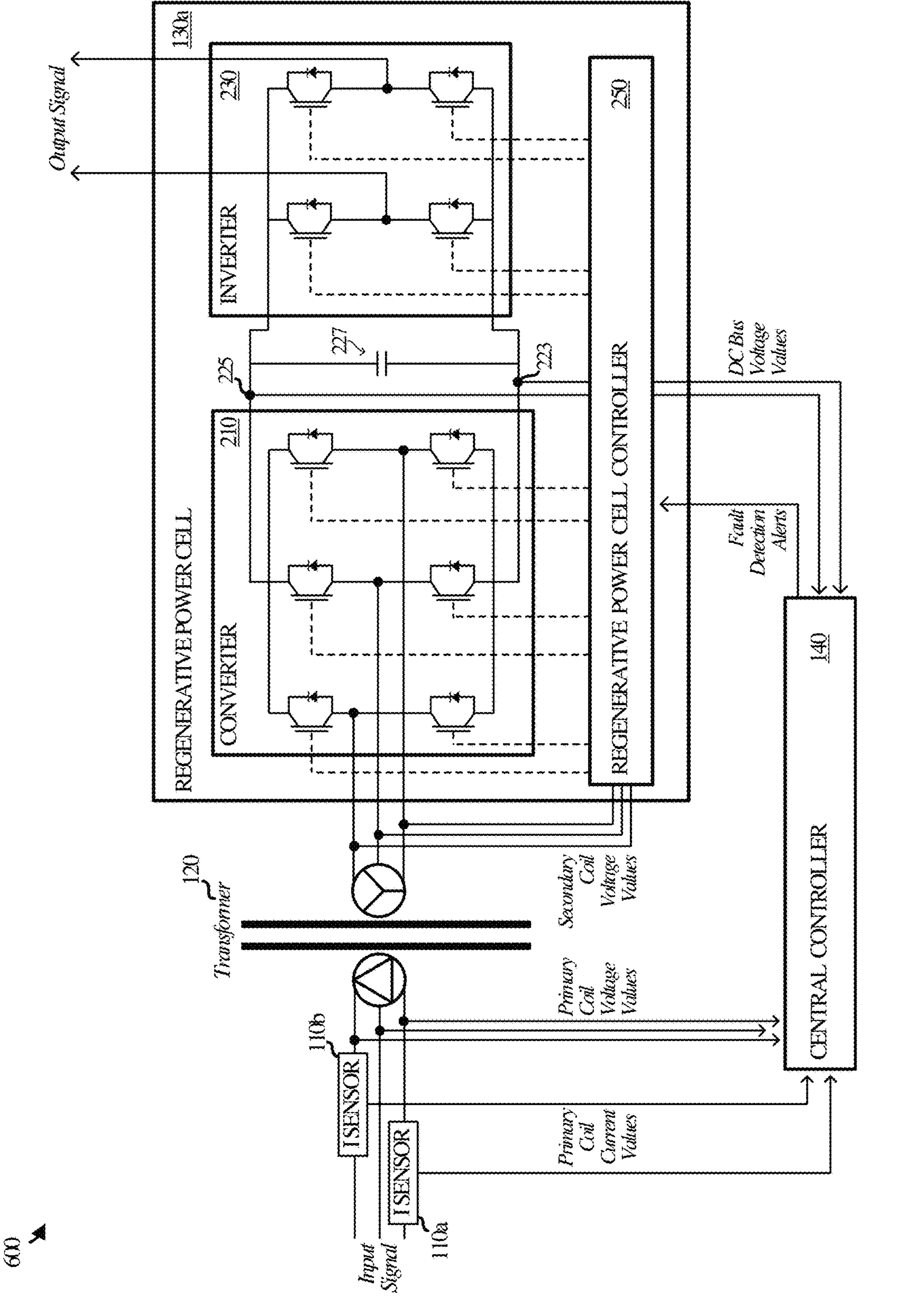
FIG. 6 illustrates a system in further detail in accordance with some embodiments of the present technology.

FIG. 6 illustrates system 100 in further detail 600 according to an implementation of the present technology, hereinafter represented by system 600. System 600 may be considered in the context of the elements of system 100 of FIG. 1, the elements of regenerative power cell 130*a* of FIG. 2, the elements of central controller in further detail 300 of FIG. 3, and the steps of method 400 of FIG. 4. System 600 is illustrated having current sensor 110*a* and current sensor 110*b* coupled with the primary coil of transformer 120. System 600 receives a three-phase input and produces a single output from a single instance of regenerative power cell 130*a*. System 600 further includes regenerative power cell 130*a* and central controller 140. Note that other examples of the systems and methods disclosed herein may include differing numbers of current sensors, regenerative power cells, and input and output phases. Each of the elements of system 600 are described in detail in the preceding figures and associated text.

In operation, system 600 receives an input signal. Here, the input signal is illustrated as a three-phase input signal but may be an input signal comprising any number of phase offset components. The input signal is received at the primary coil of transformer 120. Current sensor 110*a* and current sensor 110*b* evaluate the current characteristics of the input signal before it arrives at transformer 120. Where the output terminals of system 600 are coupled to a three-phase load with balanced impedances, a single instance (e.g., current sensor 110*a* of FIG. 1) is sufficient to characterize the amperage of each phase input of the three-phase input. Where the output terminals of system 600 are coupled to a three-phase load with imbalanced impedances, multiple current sensors (e.g., both current sensor 110*a* and current sensor 110*b* of FIG. 1, respectively) may be necessary to fully evaluate each phase of the three-phase input signal characteristics. Current sensing information is sent from one of or both of current sensor 110*a* and current sensor 110*b* to central controller 140. The current sensing information, along with voltage sensing information determined at the primary coil of transformer 120, facilitate fault detection for system 600 via central controller 140.

The input signal is transformed by transformer 120, and the transformed signal is received at the secondary coil of transformer 120. The windings of the primary coil and secondary coil are illustrated as delta and wye, respectively, but may be implemented in a number of winding schemes.

The transformed input signal is received at regenerative power cell 130*a*. Converter 210 of regenerative power cell 130*a* receives the signal and produces an output based on the gating behavior of converter 210. The gating behavior of converter 210 is determined, and revised, by regenerative power cell controller 250. Regenerative power cell controller 250 includes converter gate drive logic that determines how gating operation of converter 210 should be managed in response to a detected fault. Regenerative power cell controller 250 receives voltage sensing information collected at the input of converter 210. Converter 210 processes the signal and outputs the signal, which is received at inverter 230. The output of inverter 230 is coupled with output terminals of system 600. System 600 is illustrated with a single instance of regenerative power cell 130*a* but may include any number of instances of regenerative power cell 130*a*. Where system 600 includes multiple instances of regenerative power cell 130*a*, each of the multiple instances may be grouped into subgroups where each subgroup is associated with an output phase of a three-phase output of system 600. In some examples, multiple instances of regenerative power cell 130*a* in each subgroup correspond to a direct current component (steps) of a modified sine wave signal.

In response to detecting a fault in the operation of system 600, regenerative power cell controller 250 revises the operation of gating circuitry of converter 210 as a means to mitigate the detected fault. Similarly, where central controller 140 detects a fault in the operation of system 600, central controller 140 revises the operation of gating circuitry of inverter 230 as a means to mitigate the detected fault.

FIG. 7 illustrates controller 701 to perform firmware extension execution according to an implementation of the present technology. Controller 701 may be any of the described controllers discussed herein. As described further below, controller 701 includes extensive input/output to connect to sensors, actuators, and other control devices of the machines that are controlled by controller 701.

Controller 701 comprises processor(s) 708 interfaced with other hardware, storage system 702, which may include any suitable tangible, non-transitory, computer-readable medium, sum as random access memory (RAM), read-only memory (ROM), electrically erasable programmable read-only memory (EEPROM), or the like, and can embody components that configure operation of controller 701. Storage system 702 stores program code 703 and program data 704. In certain embodiments, controller 701 includes additional storage not shown. FIG. 7 depicts controller 701 with processor(s) 708, indicating that controller 701 may include one or more processors, including dual core processors, multi-core processors, and distributed processors.

Controller 701 executes program code 703 that configures controller 701 to perform one or more operations described herein. Examples of program code 703 include, in various embodiments, ladder logic programs, such as programs that include routines used to controller machines via machine I/O 706. Program code 703 may be resident in storage system 702 or any suitable computer-readable medium and may be executed by processor(s) 708 or any other suitable processor.

Controller 701 may generate or receive program data 704 by virtue of executing program code 703. For example, sensor data from machines and other industrial data are examples of program data 704 that may be used by controller 701 during execution of program code 703 or other code, such as controller firmware 707, for example.

Controller 701 can include communication interface system 705, which is representative of one or more of any components that facilitate a network connection. In some examples, communication interface system 705 facilitates a wireless connection and includes wireless interfaces such as IEEE® 802.11, BLUETOOTH®, or radio interfaces for accessing cellular telephone networks (e.g., a transceiver/antenna for accessing CDMA, GSM, UMTS, or other mobile communications network). In other examples, communication interface system 705 can be wired and include interfaces such as Ethernet, USB, or IEEE® 1394. For example, a controller in accordance with the present disclosure may communicate with other controllers or with automation servers using communication interface system 705.

Controller 701 includes machine I/O 706 that is coupled to the I/O interfaces of machines that controller 701 controls. In certain embodiments there is extensive machine I/O in controller 701 so that many inputs and outputs can be read and transmitted between controller 701 and the machines. The machine I/O communicates via controller firmware 707 with storage system 702, which may implement one or more APIs to allow routines to utilize the machine signals from machine I/O 706. Controller firmware 707 provides access to many hardware and embedded functions of controller 701 including operating system functions, schedulers, timers, and a hardware abstraction layer. An API within controller firmware 707 may exist to allow access to these hardware and embedded functions by providing an interface for program code 703 to interact with controller firmware 707.

Controller 701 includes programming I/O 709 which provides an interface for a technician or developer to review, modify, and create programs (e.g., ladder logic programs) to execute for controlling machines via machine I/O 706. Programming I/O 709 may provide an interface for a technician, developer, or other user to plug a device into controller 701 for visualizing programs.

Controller 701 further includes power supply 710. Power supply 710 is an industrial power supply for use in industrial automation environments. In some embodiments, power supply 710 is redundant to avoid environment failure or downtime.

While some examples provided herein are described in the context of a firmware extension development or deployment device, it should be understood that the systems and methods described herein are not limited to such embodiments and may apply to a variety of other extension implementation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A variable frequency drive system, comprising:

a transformer comprising a primary coil and multiple secondary coils;

one or more current sensors coupled to the primary coil;

a regenerative power cell coupled to each of the multiple secondary coils, the regenerative power cell comprising:

a converter circuit comprising a three-phase regenerative bridge, wherein an input of the converter circuit is coupled to the respective secondary coil, an inverter circuit comprising H-bridge circuitry, wherein an input of the inverter circuit is coupled to an output of the converter circuit through a direct current (DC) link capacitor bank, an output terminal coupled to an output of the inverter circuit, and a controller, comprising cell fault detection logic and converter gating control logic, wherein:

the cell fault detection logic is configured to detect voltage values at the input of the converter circuit, the cell fault detection logic identifies faults based at least in part on the voltage values detected at the input of the converter circuit, the converter gating control logic controls behavior of the converter circuit based on one or more of signals from the cell fault detection logic and signals from a central fault detection logic; and a central controller communicatively coupled to the regenerative power cell and the one or more current sensors, the central controller comprising the central fault detection logic and inverter gating control logic, wherein:

the central fault detection logic identifies faults based at least in part on current readings from the one or more current sensors, and the inverter gating control logic controls behavior of the inverter circuit.

2. The variable frequency drive system of claim 1, further comprising:

a plurality of regenerative power cells, wherein each of the plurality of regenerative power cells is communicatively coupled to the central controller.

3. The variable frequency drive system of claim 2, wherein the plurality of regenerative power cells are coupled together to produce a three-phase output of the variable frequency drive system.

4. The variable frequency drive system of claim 3, wherein:

the primary coil of the transformer receives a three-phase input;

the one or more current sensors comprise a single current sensor associated with a phase of the three-phase input; and the three-phase output of the variable frequency drive system is coupled with a balanced three-phase load.

5. The variable frequency drive system of claim 1, wherein:

the central controller is coupled to the primary coil and is further configured to detect voltage values at the primary coil; and the central fault detection logic identifies faults based at least in part on the voltage values detected at the primary coil.

6. The variable frequency drive system of claim 1, wherein the cell fault detection logic comprises sag detection.

7. The variable frequency drive system of claim 1, wherein the central fault detection logic of the central controller further comprises voltage sag detection logic.

8. The variable frequency drive system of claim 1, wherein the central fault detection logic of the central controller further comprises thermal overload detection logic.

9. The variable frequency drive system of claim 1, wherein the central fault detection logic of the central controller further comprises input phase loss detection logic.

10. The variable frequency drive system of claim 1, wherein the central fault detection logic of the central controller further comprises voltage unbalance detection logic.

11. The variable frequency drive system of claim 1, wherein the central fault detection logic of the central controller further comprises alternating current over voltage and under voltage detection logic.

12. The variable frequency drive system of claim 1, wherein the central fault detection logic of the central controller further comprises direct current bus over voltage and under voltage detection logic.

13. The variable frequency drive system of claim 1, wherein the cell fault detection logic of the controller of the regenerative power cell comprises phase synchronization detection logic.

14. The variable frequency drive system of claim 1, wherein the primary coil and each of the multiple secondary coils comprise one of a delta winding configuration, a star winding configuration, or a zigzag winding configuration.

15. The variable frequency drive system of claim 1, wherein:

the central fault detection logic of the central controller further comprises power regeneration detection logic; and the central fault detection logic, in response to detecting power regeneration by the power regeneration detection logic, is further configured to enable fundamental front-end control for the regenerative power cell.

16. The variable frequency drive system of claim 15, wherein:

the central fault detection logic of the central controller further comprises direct current bus rise detection logic; and the central fault detection logic, in response to detecting direct current bus rise by the direct current bus rise detection logic, is further configured to enable the fundamental front-end control for the regenerative power cell.

17. The variable frequency drive system of claim 16, wherein, in response to receiving an indication to manually enable the fundamental front-end control for the regenerative power cell, the central controller enables the fundamental front-end control for the regenerative power cell.

18. The variable frequency drive system of claim 17, wherein:

the central fault detection logic of the central controller further comprises voltage sag detection logic; and in response to detecting a voltage sag by the voltage sag detection logic and to detecting the fundamental front-end control is enabled for the regenerative power cell, the central fault detection logic is further configured to:

temporarily disable the fundamental front-end control for the regenerative power cell, and enable an inverter bus regulator to control the inverter circuit while the fundamental front-end control is disabled.

19. The variable frequency drive system of claim 18, wherein:

the cell fault detection logic of the controller of the regenerative power cell further comprises voltage sag detection logic; and in response to detecting a voltage sag by the voltage sag detection logic and to detecting the fundamental front-end control is enabled for the power cell, the cell fault detection logic is further configured to:

temporarily disable the fundamental front-end control for the regenerative power cell, and enable the inverter bus regulator to control the inverter circuit while the fundamental front-end control is disabled.

20. The variable frequency drive system of claim 19, wherein:

in response to detecting a recovered voltage sag by the voltage sag detection logic and to detecting the fundamental front-end control is disabled for the power cell, the central fault detection logic is further configured to:

enable the fundamental front-end control for the regenerative power cell, and disable the inverter bus regulator.

* * * * *